(12) United States Patent
Hansson et al.

(10) Patent No.: US 12,440,107 B2
(45) Date of Patent: Oct. 14, 2025

(54) METHOD AND DEVICE FOR OFFSET COMPENSATION

(71) Applicant: Neola Medical AB, Lund (SE)

(72) Inventors: Martin Hansson, Södra Sandby (SE); Sara Bergsten, Lund (SE)

(73) Assignee: Neola Medical AB, Lund (SE)

( * ) Notice: Subject to any disclaimer, the term of this patent is extended or adjusted under 35 U.S.C. 154(b) by 213 days.

(21) Appl. No.: 18/262,550

(22) PCT Filed: Jan. 27, 2022

(86) PCT No.: PCT/EP2022/051962
§ 371 (c)(1),
(2) Date: Jul. 21, 2023

(87) PCT Pub. No.: WO2022/162098
PCT Pub. Date: Aug. 4, 2022

(65) Prior Publication Data
US 2024/0293030 A1 Sep. 5, 2024

(30) Foreign Application Priority Data
Jan. 27, 2021 (SE) .................... 2150086-3

(51) Int. Cl.
*A61B 5/00* (2006.01)
*A61B 5/083* (2006.01)

(52) U.S. Cl.
CPC .......... *A61B 5/0075* (2013.01); *A61B 5/0084* (2013.01); *A61B 5/0833* (2013.01); *A61B 5/0836* (2013.01); *A61B 2560/0223* (2013.01)

(58) Field of Classification Search
CPC ... A61B 5/0075; A61B 5/0084; A61B 5/0833; A61B 5/0836; A61B 2560/0223; A61B 5/0059; A61B 5/7203; A61B 5/00; A61B 5/145; G01N 21/3151; G01N 21/274; G01N 2021/399; G01N 21/39; G01N 21/00; G01N 21/3504; G01J 3/42; G01J 3/00; G01J 3/02
See application file for complete search history.

(56) References Cited

U.S. PATENT DOCUMENTS

2009/0244549 A1* 10/2009 Sakaguchi ............. G01B 11/02
356/614
2014/0022381 A1* 1/2014 Heinold ................ G01J 3/0235
348/135

(Continued)

OTHER PUBLICATIONS

Klein et al., "Scattered Light and Other Corrections in Absorption Coefficient Measurements in the Vacuum Ultraviolet: A Systems Approach", Journal of Research of the National Institute of Standards and Technology, vol. 95, No. 3, pp. 337-344. (Year: 1990).*

(Continued)

*Primary Examiner* — Kiho Kim
(74) *Attorney, Agent, or Firm* — Knobbe, Martens, Olson & Bear, LLP

(57) ABSTRACT

A device and method for rescaling a signal to remove an absorption offset from an optical measurement. During a first mode a scaling factor is obtained from measurements on a reference object which is then applied during a second mode when measuring on a measurement object.

22 Claims, 2 Drawing Sheets

(56) References Cited

U.S. PATENT DOCUMENTS

2015/0138942 A1* 5/2015 Wakabayashi ..... G11B 7/00718
369/112.07
2018/0235475 A1 8/2018 Svanberg et al.

OTHER PUBLICATIONS

International Search Report issued for International Patent Application No. PCT/EP2022/051962, dated Apr. 26, 2023 in 4 pages.
Written Opinion issued for International Patent Application No. PCT/EP2022/051962, dated Apr. 26, 2023 in 6 pages.
Persson et al., "Gas monitoring in human sinuses using tunable diode laser spectroscopy"; Journal of Biomedical Optics, vol. 12, No. 5, p.p. 054001, Jan. 1, 2007.
Svanberg et al., "Diode laser spectroscopy for noninvasive monitoring of oxygen in the lungs of newborn infants"; Pediatric Research, vol. 79, No. 4, p.p. 621-628, Apr. 1, 2016.

* cited by examiner

METHOD AND DEVICE FOR OFFSET COMPENSATION

CROSS-REFERENCE TO RELATED APPLICATIONS

This application is the U.S. National Phase under 35. U.S.C. § 371 of International Application PCT/EP2022/051962, filed Jan. 27, 2022, which claims priority to Swedish Patent Application No. 2150086-3, filed Jan. 27, 2021. The disclosures of the above-described applications are hereby incorporated by reference in their entirety.

BACKGROUND OF THE INVENTION

Field of the Invention

This disclosure pertains to a device and method for removing or reducing an absorption offset in an optical measuring system, such as a system for measuring a gas concentration and/or composition in a cavity, such as a cavity in a body. In particular, the device and method allow the offset to be removed by rescaling the signal using a reference detector.

Description of the Prior Art

In a system utilizing lasers with different wavelengths, for example, one addressing oxygen gas molecules and another addressing water vapor molecules, the amount of absorption due to each gas species gives a measurement of the concentration of gas integrated over an optical pathlength the light is transmitted in the gas.

For measurements on a human body, by assuming a known concentration of water vapor in a body gas compartment, based on the fact that the relative humidity is close to 100% and that the temperature can be measured or assumed to be 37° C., an average optical pathlength in gas is calculated from the integrated gas concentration of water vapor. In turn, the oxygen gas concentration may then be calculated assuming that the average optical pathlength in gas is equal for both wavelengths.

In an optical measurement device or setup, beam preparation is typically needed to collimate and combine beam (s) and/or transport the beam(s) to the measurement object. This beam preparation is most conveniently housed in a compartment of ambient air and pressure. Thus, the two laser beams will suffer gas absorption of oxygen molecules and water vapor in this environment, which is regarded as an absorption offset to the measurement.

To remove this offset, the compartment housing the beam preparation are normally flushed with dry nitrogen at a low constant rate. This ensures that, after a while, only minimal amounts of oxygen and water vapor are present in the compartment.

This is not always a practical solution depending on the training and background of the personnel operating the device and the premises where the device is located. For example, there may be restrictions on the use of dry nitrogen and pressure gas, such as in a pressurized bottle.

There is also the issue of the offset constantly changing so that the calibration must be constantly redone.

Hence, a new device and method for reducing or removing the offset could be advantageous. In particular, a device and method which can be easy to operate and requires no or little training. It would also be advantageous in any type of premises where dry nitrogen is not available or cannot be used and that would eliminate the need for reference measurements at the site of a measurement object. Especially, it would be advantageous to have a device and method which would allow a simple design and assembly of the beam preparation.

SUMMARY OF THE DISCLOSURE

Embodiments of the present disclosure preferably seek to mitigate, alleviate, or eliminate one or more deficiencies, disadvantages, or issues in the art, such as the above-identified, singly or in any combination by providing a device, and/or method according to the description.

According to one aspect of the disclosure a method for rescaling a signal to remove an absorption offset from an optical measurement is described. The method may include a first mode. The first mode may include:

Measuring a first light signal from each of at least one light source located in a housing which has been transmitted through, or back-scattered from, a reference object located outside of the housing using an external detector.

Measuring a second light signal from each of the at least one light source located in the housing using a reference detector.

Calculating a scaling factor of each of the at least one light source using the detected first light signal and the detected second light signal.

The method may also include a second mode, such as a consecutive second mode. The second mode may include:

Measuring a third light signal from each of the at least one light source located in a housing which has been transmitted through, or back-scattered from, a measurement object located outside of the housing using the external detector.

Measuring a fourth light signal from each of the at least one light source located in the housing using a reference detector.

Applying the scaling factor to each of the detected fourth light signal which is then subtracted from each of the detected third light signal transmitted through, or back-scattered from, the measuring object.

In some examples of the disclosure, the housing may include a gas mixture, such as ambient air.

In some examples of the disclosure, the method may include transmitting the first light signal from the housing to the reference object and/or transmitting the third light signal from the housing to the measurement object using a fibre probe.

In some examples of the disclosure, the measurement object may be a cavity, such as a lung, in a body. The body may be a human body. The disclosure is not limited to bodies, the object may be any type of object that includes a cavity or pores.

In some examples of the disclosure, the third light signal may be used for measuring a gas absorption.

In some examples of the disclosure, the measured gas absorption may be used for obtaining a gas concentration of a free gas in the cavity.

In some examples of the disclosure, the reference object may be free of gas.

In some examples of the disclosure, the reference detector may be arranged inside the housing.

In some examples of the disclosure, a path length from the at least one light source to the reference detector may be different from a path length from the at least one light source to the external detector.

In some examples of the disclosure, separate scaling factors may be calculated for each of the at least one light source.

In some examples of the disclosure, the measurements may be performed using tuneable diode laser technology, such as used for GASMAS.

In some examples of the disclosure, the first signal and the second signal are measured simultaneously during the first mode. Additionally, and/or alternatively, in some examples of the disclosure, the third signal and the fourth signal may be measured simultaneously during the second mode.

In a further aspect of the disclosure, a device for performing an optical measurement is described, such as a medical device. The device may include a housing which may include a gas mixture, at least one light source may be arranged in the housing and configured for transmitting a light signal corresponding to each light source of the at least one light source, an external detector and a reference detector, an optical arrangement which may be configured to direct the light signal out of the housing to the external detector and to direct the light signal to the reference detector.

The device may further include a control unit which may be configured for operating in a first mode. The first mode may include recording the light signal being a first light signal transmitted through, or back-scattered from, a reference object using the external detector and recording the light signal being a second light signal using the reference detector. Calculating a scaling factor using the detected first light signal and the detected second light signal.

The control unit may also be configured for operating in a second mode. The second mode may include recording the light signal being a third light signal transmitted through, or back-scattered from, a measurement object using the external detector and recording the light signal being a fourth light signal using the reference detector and applying the scaling factor to the detected fourth light signal and subtract from the detected third light signal to obtain a corrected light signal with a reduced offset.

The examples given in the disclosure is mainly directed to a medical device, but the device may be any type of gas measuring device used in non-medical applications. For these types of devices, the same components and principles are applicable.

In some examples of the disclosure, the reference detector may be arranged in the housing.

In some examples of the disclosure, the optical arrangement may be a beam sampler, such as a beam splitter, or a pick-off mirror. Other types of beam samples are described in the description.

In some examples of the disclosure, the first light signal may be a first portion of the light signal and the second light signal may be a second portion of the light signal emitted during the first mode. E.g. the light signal is directed into two portions, a first and a second portion. Additionally, and/or alternatively, in some examples, the third light signal may be a third portion of the light signal and the fourth light signal may a fourth portion of the light signal emitted during the second mode. E.g. the light signal is directed into two portions, a third and a fourth portion.

In some examples of the disclosure, the control unit may be further configured for obtaining a gas concentration or gas distribution based on the corrected light signal.

It should be emphasized that the term "comprises/comprising" when used in this specification is taken to specify the presence of stated features, integers, steps, or components but does not preclude the presence or addition of one or more other features, integers, steps, components, or groups thereof.

BRIEF DESCRIPTION OF THE DRAWINGS

These and other aspects, features and advantages of which examples of the disclosure are capable of will be apparent and elucidated from the following description of examples of the present disclosure, reference being made to the accompanying drawings, in which:

FIGS. 1A and 1B are illustrating exemplary schematic illustrations of the components of the disclosed device, wherein FIG. 1A is illustrating the device in an exemplary offset adjustment mode and FIG. 1B is illustrating the device in an exemplary measurement mode.

DESCRIPTION OF EXAMPLES

Specific examples of the disclosure will now be described with reference to the accompanying drawings. This disclosure may, however, be embodied in many different forms and should not be construed as limited to the examples set forth herein; rather, these examples are provided so that the disclosure will be thorough and complete, and will fully convey the scope of the disclosure to those skilled in the art.

The inventors have found a way of eliminating or reducing an offset in the absorption spectra during spectroscopic measurements due to ambient air which does not involve flushing dry nitrogen in the space of the laser beam and further eliminates the need for reference measurements at the site of the measurement object. The offset appears because a light beam experiences gas absorption when being transmitted through ambient.

The invention will simplify the operation and handling of the optical measurement device compared to previous known methods for reducing or eliminating the effect on an absorption measurement. The method and device will also allow a simpler design and assembly of the beam preparation compared to other available methods or system.

Figure 1A:
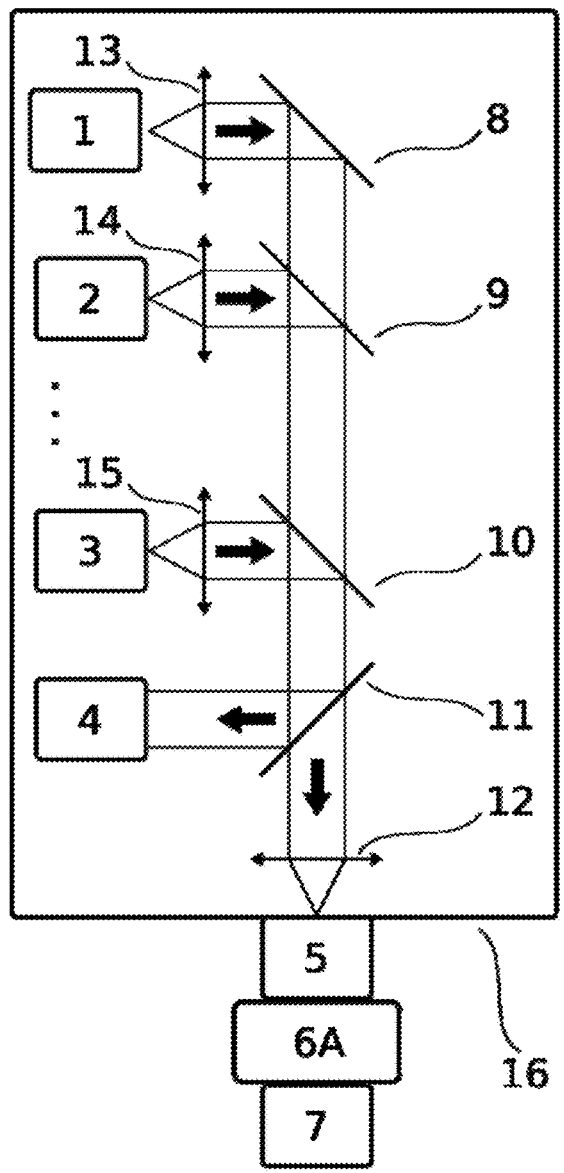
Figure 1B:
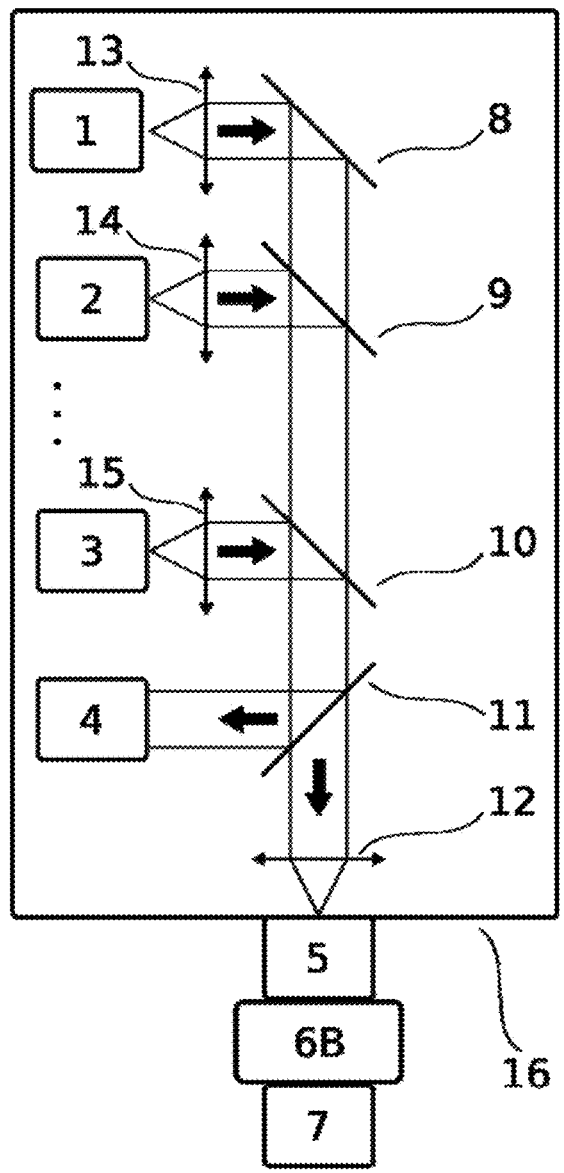

FIGS. 1A and 1B are illustrating a schematic system for rescaling a signal to remove an absorption offset from an optical measurement when detecting gas distributions and/or gas concentrations. The rescaling described herein is particular suitable for Tuneable Diode Laser Absorption Technology (TDLAS), such as Gas in Scattering Media Absorption Spectroscopy (GASMAS).

When utilizing Tuneable Diode Laser Absorption Spectroscopy (TDLAS) to detect gas in a scattering material, such as tissue, where the light-absorbing free gas is dispersed in cavities surrounded by a medium, a wavelength of at least one light source 1, 2, 3 is swept over an absorption peak or band of a gas to be measured. A sweep where each step could be down to a scale below a nanometre.

GASMAS is the principle that the spectrally sharp gas absorption may be distinguished from a broadband absorption of liquids and solids. This results in that a small gas absorption signal (down to a fraction of the order of 1 in 10 000) may be extracted from light passing through a scattering and absorbing material despite transmitting only a minor fraction of the injected light when using GASMAS technology. For GASMAS technology the wavelength is tuned over a specific gas absorption line, for example, by ramping the drive current.

In some examples, the detection is made frequency-sensitively and/or phase-sensitively. The light, such as laser light, from the at least one light source 1, 2, 3 may be wavelength modulated at a selected frequency, and synchronous intensity variations may be detected when the modulation is conducted around a gas absorption wavelength.

When modulation is conducted close to a gas absorption wavelength, the intensity of the detected light may quickly change at small variations of the wavelength, as described in S. Svanberg, Gas in Scattering Media Absorption Spectroscopy—from Basic Studies to Biomedical Applications, Lasers and Photonics Reviews 7, 779 (2013), which is incorporated herein by reference.

The measured intensity of light incident on a detector 7 may then be converted to a measurement of the absorption by the gas in the sample. By having an estimated known gas concentration of a gas in the sample, such as water, the absorption of the gas may be converted to a measurement of the average distance the light travelled through the gas. The travel distance, or path length, may be used to estimate an unknown concentration of a second gas.

In the system, the at least one light source 1, 2, 3 is arranged in a housing 16 which may include a gas mixture. In most cases the air mixture is ambient air, but other compositions are possible. The housing 16 may also include beam preparation components, for collimating the beams from the light sources, combining beams from multiple light sources and/or coupling the beams into a probe 5 for transmitting the light to a measuring site at a measuring object 6A. The components for collimating and/or combining the beams may typically be lenses and mirrors known to the person skilled in the art.

In the schematic drawings, a first light source 1 may either be arranged to emit light along an optical axis of the combined beam or, as illustrated, a mirror 8 may be used for folding the light beam emitted from light source 1 to be transmitted along the optical axis.

In the illustrated example, beam combiners 9, 10 may be used for combining the beams of at least a second light source 2, 3 with the beam of the first light source 1. The beam combiners 9, 10 may be dichroic mirrors. Collimating lenses 13, 14, 15 may be arranged in front of each light source 1, 2, 3. Alternatively, the mirrors 8, 9 and 10 may be used for collimating the beams. Alternatively, a lens system may be arranged for collimating the beams after they have been combined.

In the housing 16, the light is, at least partly, transmitted in an open beam path whereby the light is traveling through the gas mixture inside the housing 16. Part of the light may therefore be absorbed by the gas mixture in the housing 16 and the absorption may cause an offset in the measured absorption signal.

Using optical elements, the individual light beams from each light source of the at least one light source 1, 2, 3 may be collimated and then combined into a single beam. The single beam may therefore include light from each light source 1, 2, 3 arranged in the housing 16. After the light beams from each of the at least one light source 1, 3, has been collimated and combined into a single beam, the combined beam may be coupled to a proximal end of a measuring probe 5 for transferring the light to a measuring site at the measurement object 6B. The measurement object 6B may include a cavity of pores having at least one free gas. The combined beam may be coupled to the proximal end of the measuring probe 5 by a lens or a lens system 12. The measuring probe 5 may be made of a waveguide, such as optical fibre. The measuring probe 5 may be held against the measuring site, or arranged inside the measuring object, such as arranged inside a human for measuring the gas in a cavity. For arranging the probe 5 inside the measurement object 6B, the waveguide or optical fibre may be arranged in a catheter or an endoscope.

In an example, two or more light sources 1, 2, 3 are used for measuring at least one free gas. Depending on the measured gas, the wavelengths of the at least two light sources 1, 2, 3 may be adapted to match absorption peaks of at least two gases. For example, the wavelength may be adapted to about 760 nm for addressing oxygen gas, and to about 820 nm or 935 nm for addressing water vapour. Other wavelengths may be used depending on the gases to be detected.

The concentration of water vapour can be estimate based on relative humidity and a measured temperature and may therefore be used as a reference gas for obtaining an estimated path length to be used when measuring gases with an unknown concentration, for example oxygen or carbon dioxide. In some examples other gases than water vapour may be used as a reference gas. The requirement is only that the gas concentration may be calculated without using the path length the detected light has travelled through the cavity or pores in which the gas with an unknown concentration is located.

Alternatively, in other examples only one light source 1, 2, 3 may be used and the path length through the cavity and pores may be estimated by other means.

The at least one light source 1, 2, 3 may be semiconductor lasers, for example distributed feed-back lasers (DFBL), vertical cavity surface emitting lasers (VCSEL) or other types of available lasers. The power of the emitted light is preferably in the range 0.1 mW to 3000 mW.

The lasers may be driven by a current and temperature regulating unit included in a drive unit. The drive unit may be controlled by a control unit, such as a computer. The control unit may be used for signal processing and evaluation of the measured data. All determinations or calculations described herein may be performed by a control unit or a data processing device (not illustrated).

The control unit or a data processing device may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, a processing unit serves as one element/means when executing one instruction, but serves as another element/means when executing another instruction. In addition, one element/means may be implemented by one instruction in some cases, but by a plurality of instructions in some other cases. Such a software-controlled computing device may include one or more processing units, e.g., a CPU ("Central Processing Unit"), a DSP ("Digital Signal Processor"), an ASIC ("Application-Specific Integrated Circuit"), discrete analogue and/or digital components, or some other programmable logical device, such as an FPGA ("Field Programmable Gate Array"). The data processing device may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special purpose software may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The data processing device may include one or more communication interfaces, such as a serial interface, a parallel interface, a USB interface, a wireless interface, a network adapter, etc., as well as one or more data acquisition devices, such as an A/D converter.

The special-purpose software may be provided to the control unit or data processing device on any suitable computer readable medium, including a record medium and a read-only memory.

The system further includes a detector 7 for detecting light being transmitted through, or back scattered from, the measurement object 6B to be measured. The detector 7 may be arranged directly on the object 6B to be measure, or a waveguide, such as fibres could be used to collect the light at the object 6B to be measured and transmitting it to the detector 7.

The detector unit 7 may include photodiodes, photomultiplier tubes, avalanche photodiodes, charge-coupled devices (CCD), or CMOS light sensitive devices.

When measuring on tissue, for example on a gas in a cavity in a human body such as a lung, the detector unit 7 may be adapted to be positioned dermally on the subject.

FIG. 1A is illustrating a first mode, which may be an offset-adjustment mode of the system. The system includes a second detector 4 which is a reference detector. The reference detector 4 may be arranged inside the housing 16. Alternatively, the reference detector 4 may be connected directly to the housing 16 or to the housing 16 via a waveguide, such as a fibre.

In the offset-adjustment mode, a first light signal from each of at least one light source 1, 2, or 3 located in the housing 16 is transmitted through, or back scattered, from a reference object 6A located outside of the housing 16. The light is detected by an external detector 7. The external detector 7 may be the same detector 7 as the detector used when performing the measurements on the measurement object 6B including a cavity with a gas to be measured, such as a human subject.

The reference object 6A is preferably a gas-free medium. Alternatively, the reference object 6A may have a cavity or pores with a known gas concentration/absorption. The known gas concentration/absorption is preferably made of the same gases to be detected in the measurement object 6B.

The light is transmitted from the housing 16 to the reference object 6A using the measuring probe 5 to be used for the measurements on the measurement object 6B, such as a human subject.

A second light signal from each of the at least one light source 1, 2, 3 located in the housing 16, is measured using the reference detector 4.

The first and second light signal may be measured simultaneously or sequentially. For measuring the first and second light signal, a beam sampler 11 may be used.

When the first and second light signals are measured simultaneously, the first light signal may be a first portion of the combined beam and the second light signal may be a second portion of the combined beam. E.g. the combined light beam is split into two portions.

A control unit may then be used for calculating a separate scaling factor related each of the at least one light source 1, 2, 3, arranged inside the housing 16, using the detected first light signal and the detected second light signal.

The first and second light signals may be measured simultaneously or sequentially.

FIG. 1B is illustrating a second mode, which may be measuring mode. The second mode may be a consecutive mode and may be performed after the first mode has been completed. Alternatively, the measurement mode may be performed first, and the offset-adjustment mode may be performed after.

During the second mode, the measurement is performed on the measurement object 6B. A third light signal from each of the at least one light source 1, 2, 3, located in a housing 16, is measured using the external detector 7. The detected third light signal has been transmitted through, or back scattered, from the measurement object 6B. The light signal is transmitted from the housing 16 to the measurement object 6B via a measuring probe 5. The measuring probe 5 is the same as the probe 5 used for the measurements during the first mode, i.e., the offset-adjustment mode.

A fourth light signal from each of the at least one light source 1, 2, 3, located in the housing 16, is measured using the reference detector 4.

The third and fourth light signal may be measured simultaneously or sequentially. For example, a fourth light signal may be measured between each measured third light signal, or after two measured third light signals, or after each third measured third light signal, or after each fourth measured third light signal etc.

For measuring the first and second light signals, and/or the third and fourth light signals, a beam sampler 11 may be used.

When the first and second light signal, and/or the third and fourth light signals, are measured simultaneously, the first light signal, and/or the third light signal, may be a first portion of the combined light beam and the second light signal, and/or the fourth light signal, may be a second portion of the combined light beam.

Using a control unit, the calculated scaling factor, related to each of the at least one light sources, may be applied to each of the detected fourth light signal, respectively. The resulting values related to each of the at least one light source 1, 2, 3 may be subtracted from the detected third light signal of each of the at least one light source 1, 2, 3 transmitted through, or back-scattered from, the measuring object 6B. The third signal of the at least one light source may then be rescaled, and the offset caused by the gas in the housing 16 may be removed to obtain a corrected light signal for each of the at least one light source 1, 2, 3 based on the third light signal obtained from performing a measurement on the measurement object 6B. The corrected light signal may then be used for estimating and/or calculating a gas absorption of a free gas in the cavity or pores in the measurement object 6B. The absorption may be used for obtaining, estimating and/or calculating a gas distribution and/or gas concentration of the gas free in the cavity or pores in the measurement object 6B.

Alternatively, in some examples the second mode in FIG. 1B may be performed first and the first mode in FIG. 1A may be performed consecutively. The information is then recorded, for example on the control unit, and the scaling and adjustment of the offset is done afterwards.

When performing the scaling as described herein, a path length from the at least one light source 1, 2, 3 to the reference detector 4 may differ from a path length from the at least one light source 1, 2, 3 to the external detector 7.

In some examples, when calculating the scaling factor, an individual scaling factor may be calculated for each of the at least one light source.

To measure a first signal and a second signal simultaneously using the external detector 7 and the reference detector 4, various configurations of the components inside the housing may be used.

In one configuration, the beam sampler arrangement 11 may be a diffuser arranged in the beam path and the reference detector 4 may be arranged to directly detect a portion of the diffused light before the light is coupled to the probe 5.

In another configuration of the beam sampler arrangement 11, the beam from the at least on light source 1, 2, 3 may be collimated using optical components, such as a system of lenses. The collimated beam may have a diameter of about 1 to 4 mm or larger. In some examples, the diameter may be smaller than 1 mm depending on the detector used. The reference detector 4 may be arranged to directly sample a portion of this collimated beam while the signal not being detected by the reference detector 4 is coupled to the probe 5.

Another alternative of a beam sampler arrangement 11 may be to arrange a beam splitter in the beam path. The beam splitter may direct a portion of the beam emitted from the at least one light source 1, 2, 3 to the reference detector 4 and transmit another portion to be coupled to the probe 5.

Alternatively, in another beam sampler arrangement 11, a mirror may be arranged in the beam path, such as a dichroic mirror or a pick-off mirror. The mirror may direct a portion of the beam to the reference detector 4 while allowing another portion to be transmitted and coupled to the probe 5.

Yet another alternative, could be to use more than one reference detector 4. For example, a reference detector may be used for each of the light sources 1, 2, 3. In this arrangement, a portion of the emitted light from each light source 1, 2, 3 may be detected by each reference detector 4 before the light from each light source 1, 2, 3 is joint into a single beam and coupled to the probe 5.

For sequential measurements, a moving mirror, such as a flipping, may be used to divert the beam between the reference detector 4 and to be coupled to the probe 5.

The advantage of the above-described way of performing a rescaling is that one adjustment measurement can be performed and may then be used even if the conditions changes, such as the humidity, pressure, temperature, etc. Hence, only one calibration measurement is required instead of continuously updating the calibration measurements, for example at certain time intervals or when the environmental conditions changes. The reason is that the reference signal is constantly being measure simultaneously with the measuring signal.

Figure 2:
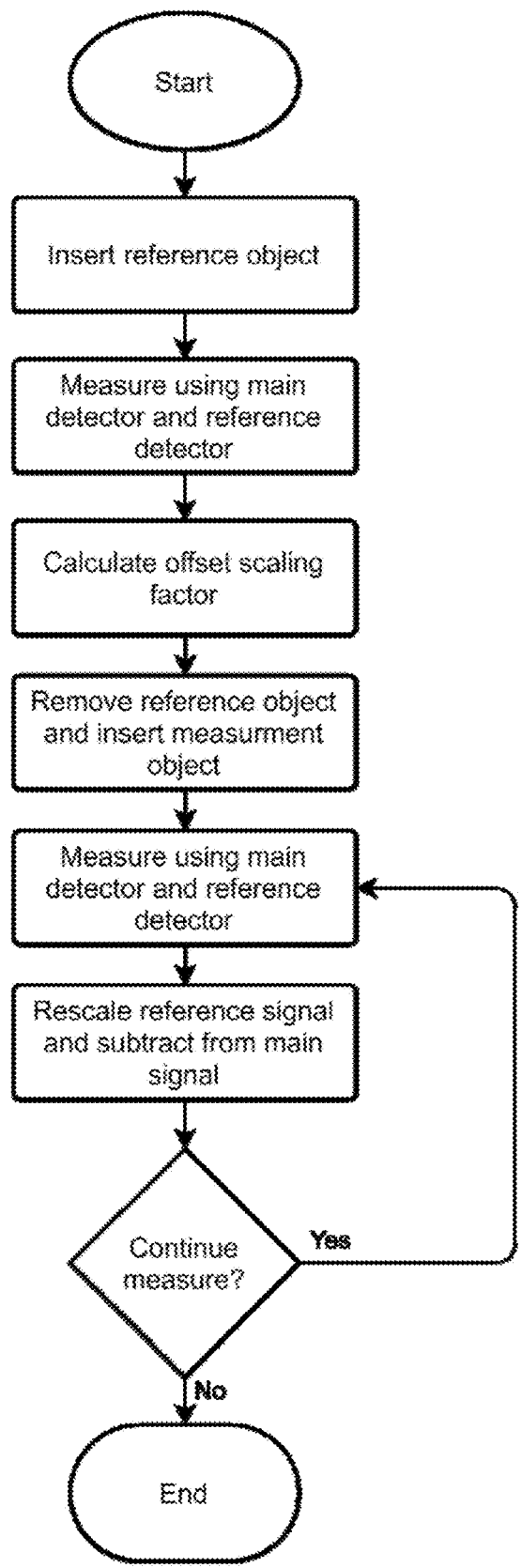
FIG. 2 is illustrating an exemplary flowchart of the described method.

FIG. 2 is illustrating an exemplary flowchart of a method for rescaling a signal to remove an absorption offset in a light signal during optical measurements. The offset may be caused by the beam being transmitted as an open beam through a gas mixture, such as ambient air. The method may include: A first mode wherein a reference object is inserted at a distal end of an optical probe.

Measuring a first light signal from each of at least one light source located in a housing which has been transmitted through, or back-scattered from, a reference object located outside of the housing using an external detector. The first light signal from each of the at least one light source may be transmitted as a combined beam being the light signals from each of the at least one light source combined into a single beam.

Measuring a second light signal from each of the at least one light source located in the housing using a reference detector. The second light signal from each of the at least one light source may be transmitted as a combined beam being the light signals from each of the at least one light source combined into a single beam.

Calculating an offset scaling factor for each of the at least one light source using the detected first light signal and the detected second light signal.

A second mode, such as a consecutively performed mode, wherein the reference object is removed, and the measurement object is placed on the measurement object.

Measuring a third light signal from each of the at least one light source located in a housing which has been transmitted through, or back scattered from, a measurement object located outside of the housing using the external detector. The third light signal from each of the at least one light source may be transmitted as a combined beam being the light signals from each of the at least one light source combined into a single beam.

Measuring the fourth light signal from each of the at least one light source located in the housing using a reference detector. The fourth light signal from each of the at least one light source may be transmitted as a combined beam being the light signals from each of the at least one light source combined into a single beam.

Applying the scaling factor, related to each of the at least one light source, to each of the detected fourth light signal, respectively. The resulting values may then be subtracted from the detected third light signal of each of the at least one light source transmitted through, or back scattered from, the measuring object to obtain a corrected light signal for each of the at least one light sources.

The corrected light signal may then be used for obtaining the gas absorption, distribution and/or concentration in a cavity or pores of the measurement object.

The present invention has been described above with reference to specific examples. However, other examples than the above described are equally possible within the scope of the disclosure. Different method steps than those described above may be provided within the scope of the invention. The different features and steps of the invention may be combined in other combinations than those described. The scope of the disclosure is only limited by the appended patent claims.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

What is claimed is:

1. A method for rescaling a signal to remove an absorption offset from an optical measurement, said method comprising:
    a first mode comprising:
        measuring a first light signal from each of at least one light source located in a housing which has been transmitted through, or back-scattered from, a reference object located outside of said housing using an external detector;

measuring a second light signal from each of said at least one light source located in said housing using a reference detector;

calculating a scaling factor of each of said at least one light source using said detected first light signal and said detected second light signal; and a second mode:

measuring a third light signal from each of said at least one light source located in said housing which has been transmitted through, or back-scattered from, a measurement object located outside of said housing using said external detector;

measuring a fourth light signal from each of said at least one light source located in said housing using a reference detector;

applying said scaling factor to each of said detected fourth light signal which is then subtracted from each of said detected third light signal transmitted through, or back-scattered from, said measuring object.

2. The method of claim 1, wherein said housing comprises a gas mixture.

3. The method of claim 2, wherein the gas mixture is ambient air.

4. The method of claim 1, further comprising transmitting said first light signal from said housing to said reference object and/or transmitting said third light signal from said housing to said measurement object using a fibre probe.

5. The method of claim 1, wherein said measurement object is a cavity in a body.

6. The method of claim 5, wherein the cavity is a lung.

7. The method of claim 1, wherein said third light signal is used for measuring a gas absorption.

8. The method of claim 7, wherein said gas absorption is used for obtaining a gas concentration of free gas in said cavity.

9. The method of claim 1, wherein said reference object is a gas-free medium.

10. The method of claim 1, wherein said reference detector is arranged inside said housing.

11. The method of claim 1, wherein a path length from said at least one light source to said reference detector is different from a path length from said at least one light source to said external detector.

12. The method of claim 1, wherein separate said scaling factors are calculated for each of said at least one light source.

13. The method of claim 1, wherein said measurements are performed using tunable diode laser technology.

14. The method of claim 13, wherein the tunable diode laser technology is used for GASMAS.

15. The method of claim 1, wherein said first signal and said second signal are measured simultaneously during said first mode and/or wherein said third signal and said fourth signal are measured simultaneously during said second mode.

16. The method according to claim 1, wherein the second mode is a consecutive second mode.

17. A medical device for performing an optical measurement, the device comprising:

a housing comprising a gas mixture;

at least one light source arranged in said housing and configured for transmitting a light signal corresponding to each light source of said at least one light source, an external detector and a reference detector;

an optical arrangement configured to direct said light signal out of said housing to said external detector and to direct said light signal to said reference detector;

a control unit configured for operating in:

a first mode recording said light signal being a first light signal transmitted through, or back scattered from, a reference object using said external detector and recording said light signal being a second light signal using said reference detector, calculating a scaling factor using said detected first light signal and said detected second light signal; and a second mode recording said light signal being a third light signal transmitted through, or back scattered from, a measurement object using said external detector and recording said light signal being a fourth light signal using said reference detector, applying said scaling factor to said detected fourth light signal and subtract from said detected third light signal to obtain a corrected light signal with a reduced offset.

18. The device of claim 17, wherein said reference detector is arranged in said housing.

19. The device of claim 17, wherein said optical arrangement is a beam sampler.

20. The device of claim 19, wherein the beam sampler is a beam splitter or a pick-off mirror.

21. The device of claim 17, wherein said first light signal is a first portion of said light signal and said second light signal is a second portion of said light signal emitted during said first mode, and/or wherein said third light signal is a third portion of said light signal and said fourth light signal is a fourth portion of said light signal emitted during said second mode.

22. The device of claim 17, wherein said control unit is further configured for obtaining a gas concentration or distribution based on said corrected light signal.

* * * * *